United States Patent [19]
Renneker

[11] Patent Number: 4,562,897
[45] Date of Patent: Jan. 7, 1986

[54] VEHICLE DRIVETRAIN INCLUDING VISCOUS CLUTCH

[75] Inventor: Dennis N. Renneker, Troy, Mich.

[73] Assignee: American Motors Corporation, Southfield, Mich.

[21] Appl. No.: 545,199

[22] Filed: Oct. 25, 1983

[51] Int. Cl.$^4$ ............................................. B60K 17/34
[52] U.S. Cl. ............................... 180/233; 74/665 GA; 74/700; 180/247; 192/58 B
[58] Field of Search ............... 180/233, 245, 246, 247, 180/248, 249, 250, 251, 197; 74/700, 665 GA; 192/58 B, 66, 67 R

[56] References Cited

U.S. PATENT DOCUMENTS

| | | | |
|---|---|---|---|
| 2,744,421 | 5/1956 | Lammerz | 74/665 GA |
| 3,348,645 | 10/1967 | Sigg | 192/67 R |
| 3,923,113 | 12/1975 | Pagdin | 180/249 |
| 4,031,780 | 6/1977 | Dolan et al. | 74/711 |
| 4,046,239 | 9/1977 | Tinholt | 192/58 B |
| 4,373,604 | 2/1983 | Lunn et al. | 180/247 |
| 4,381,828 | 5/1983 | Lunn et al. | 180/247 |
| 4,431,079 | 2/1984 | Suzuki | 180/233 |
| 4,452,331 | 6/1984 | Lunn et al. | 180/247 |

FOREIGN PATENT DOCUMENTS

| | | | |
|---|---|---|---|
| 903905 | 2/1954 | Fed. Rep. of Germany | 180/247 |
| 131426 | 10/1981 | Japan | 180/233 |
| 114726 | 7/1982 | Japan | 180/233 |
| 71221 | 4/1983 | Japan | 180/247 |
| 101829 | 6/1983 | Japan | 180/233 |
| 887849 | 1/1962 | United Kingdom | 180/233 |
| 1357106 | 6/1974 | United Kingdom | |
| 2108221 | 5/1983 | United Kingdom | 180/233 |

*Primary Examiner*—Joseph F. Peters, Jr.
*Assistant Examiner*—Mitchell J. Hill
*Attorney, Agent, or Firm*—Brooks & Kushman

[57] ABSTRACT

A vehicle drivetrain (16) disclosed includes a viscous clutch (30) that is driven by an auxiliary output (52) of a transaxle (28) to provide four-wheel driving when needed while providing two-wheel driving at other times. A selector (54) is preferably incorporated to selectively (a) disconnect the auxiliary output (52) of the transaxle from the pair of wheels not normally driven thereby, (b) connect the auxiliary output (52) of the transaxle to the second pair of wheels through the viscous clutch (30), or (c) connect the auxiliary output (52) of the transaxle to an output (60) of the viscous clutch (30) in a bypassed relationship to the clutch. The drivetrain (16) has particular utility when utilized with a transversely mounted front engine and can be utilized with a transaxle (28) of either the automatic or manual shifting type.

5 Claims, 2 Drawing Figures

VEHICLE DRIVETRAIN INCLUDING VISCOUS CLUTCH

TECHNICAL FIELD

This invention relates to a vehicle drivetrain for providing four-wheel driving.

BACKGROUND ART

Vehicle drivetrains for providing four-wheel driving have been developed in the past to provide increased traction and the consequent ability to negotiate roads and other terrain on which travel would not be possible with the more conventional two-wheel driving. Certain four-wheel drivetrains drive all four wheels without any differential action between the front and rear axles. As such, these vehicles have good mobility under adverse terrains but are not particularly driveable on normal road conditions. This is because such drivetrains drive the front and rear wheels at the same speed such that turning results in sliding and/or scuffing of the wheels. To overcome such problems, transfer cases are utilized to selectively disconnect one pair of wheels while maintaining the driving of the other pair of wheels.

U.S. Pat. Nos. 3,923,113 and 4,031,780 disclose vehicle drivetrains which were developed to permit four-wheel driving with a differential operating between the front and rear wheels in order to permit road driving with all four wheels even when there is a difference in speed between the front and rear wheels such as is involved with turning. To prevent excessive speed differences between the front and rear wheels and possible slippage, the differentials utilized with such drivetrains are normally of the limited slip type similar to those used with vehicle axles to prevent slippage of the left or right wheel as the other remains stationary.

United Kingdom Pat. No. 1,357,106 discloses a vehicle drivetrain that normally drives through the rear wheels but has a viscous control coupling for driving the front wheels when there is a significant speed difference between the front and rear wheels. This viscous control coupling prevents rear wheel slippage by driving through the front wheels and also inhibits front or rear wheel locking.

Until the recent introduction of front-wheel drive vehicles, most vehicles included a front engine for driving a transmission and a prop shaft that connected the output of the transmission with a rear wheel differential for providing rear wheel driving. With such drivetrains, a transfer case is interposed between the transmission and the rear wheel differential and has an output that is selectively connected to the front wheels to provide front wheel driving. A differential can be conveniently incorporated into the transfer case to provide differential action between the front and rear wheels in order to accommodate for difference in travel such as is required in normal road driving.

Recently introduced front-wheel drive vehicles include a transaxle whose input is driven by the vehicle engine and whose output drives the adjacent front wheels. With such transaxle drivetrains, transfer cases are not conventionally incorporated to additionally permit rear wheel driving under road conditions since incorporation of a differential between the front and rear wheels is not readily possible. Rather, such a transaxle drivetrain for permitting four-wheel driving would require that the output from the transaxle for driving the front wheels first pass through a torque path through a differential in the transfer case and then back through the transaxle to the front wheels. Such a construction can be achieved by the use of a central output shaft and concentric sleeves that provide the torque path to the transfer case differential, but this construction is somewhat involved and adds substantial cost.

DISCLOSURE OF INVENTION

An object of the present invention is to provide an improved vehicle drivetrain of the transaxle type for providing four-wheel driving when needed.

In carrying out the above object, the vehicle drivetrain includes a transaxle having an input that is rotatively driven by the output of the vehicle engine. A primary output of the transaxle provides driving of a first pair of wheels. The transaxle also has an auxiliary output that is associated with a second pair of wheels. A viscous clutch connects the auxiliary output of the transaxle with the second pair of wheels to provide driving thereof along with the first pair of wheels when there is more than a predetermined difference in the average speeds of the first and second pairs of wheels. With such a drivetrain, the transaxle normally only drives the first pair of wheels but provides driving of the second pair of wheels when needed such as when the first pair of wheels loses traction and begins to spin or locks up and begins to skid.

In the preferred construction, the vehicle drivetrain also includes a selector for controlling the operation of the viscous clutch. This selector is operable to disconnect the auxiliary output of the transaxle from the second pair of wheels when only two-wheel driving is necessary such that the viscous clutch is then inoperable. The selector is positioned to connect the auxiliary output of the transaxle with a rotary input of the viscous clutch in order to permit a rotary output of the viscous clutch to provide the rear wheel driving when necessary. In addition, the selector can be positioned to connect the auxiliary output of the transaxle with the output of the viscous clutch to directly drive the second pair of wheels in a bypassed relationship to the viscous clutch.

Particular utility has been found to result when the drivetrain is incorporated in a vehicle with an engine that is mounted transversely with respect to the vehicle, especially with a front engine whose transaxle normally provides front wheel driving with the viscous clutch providing rear wheel driving.

As illustrated by two different embodiments disclosed, the viscous clutch drivetrain of the invention can be utilized with either a transaxle having an automatic transmission for shifting gears or a transaxle having a manual transmission for shifting gears.

The objects, features, and advantages of the present invention are readily apparent from the following detailed description of the best modes for carrying out the invention when taken in connection with the accompanying drawings.

BEST MODES FOR CARRYING OUT THE INVENTION

Figure 1:
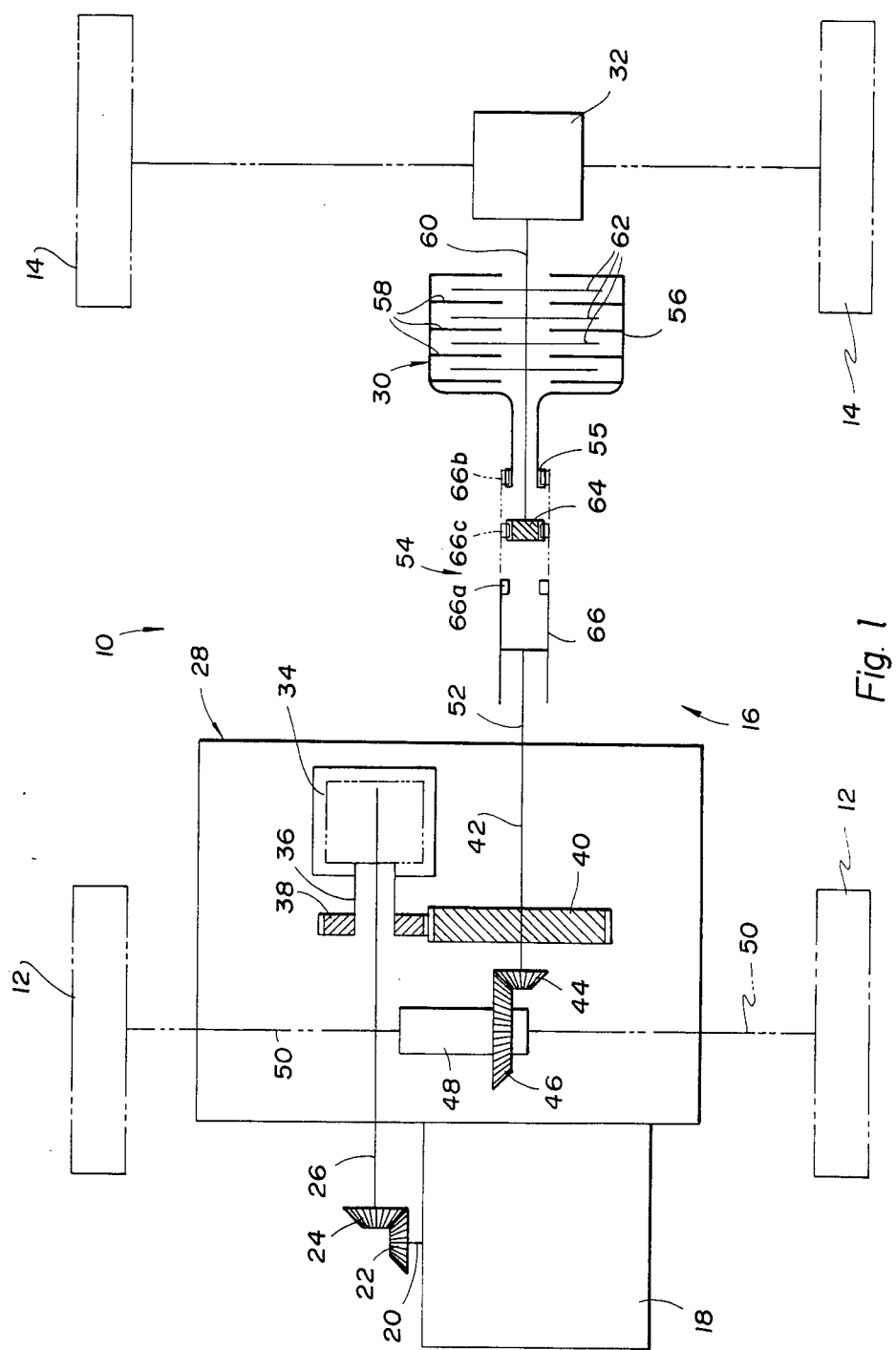
FIG. 1 is a schematic view of a vehicle having a drivetrain constructed in accordance with the present invention and including an automatic transaxle for providing wheel driving.

With reference to FIG. 1 of the drawings, a schematically illustrated vehicle generally indicated by 10 includes a pair of front wheels 12 and a pair of rear wheels 14 that are driven by a drivetrain 16 in accordance with the present invention as is hereinafter more fully described. Vehicle 10 includes a front engine 18 which is transversely mounted with respect to the vehicle such that its crankshaft extends laterally with respect to the longitudinal axis of the vehicle. A rotary output 20 of engine 18 drives a gear 22 meshed with another gear 24 that drives an input 26 of a transaxle 28 of the drivetrain. As is hereinafter more fully described, transaxle 28 of the drivetrain normally provides driving of the front wheels 12 without any driving of the rear wheels 14. However, a viscous clutch 30 of the drivetrain is also provided to drive a rear wheel differential 32 for driving the rear wheels 14 when needed such as when the front wheels lose traction and begin to either slip or skid.

Transaxle 28 of the vehicle 10 illustrated in FIG. 1 includes an automatic transmission 34 that is driven by the rotary input 26 of the transaxle and provides automatic gear shifting. A rotary output 36 of the transaxle transmission 34 drives a gear 38 meshed with a gear 40 on a shaft 42. One end of shaft 42 drives a gear 44 meshed with a gear 46 of a schematically indicated differential 48 of the transaxle. Differential 48 is connected to a pair of shafts 50 that drive the pair of front wheels 12 while providing differential action as needed between the two front wheels.

Transaxle 28 also includes an auxiliary output 52 which is provided by the end of shaft 42 opposite the end thereof that drives the gear 44. As is hereinafter more fully described, a selector generally indicated by 54 is operable to connect the auxiliary output 52 of the transaxle 28 with the viscous clutch 30 to provide driving of the rear wheels 14 when there is more than a predetermined difference in the average speeds of the front pair of wheels 12 and the rear pair of wheels 14. For example, when the front pair of wheels 12 lose traction and begin to spin, the viscous clutch will then provide driving of the rear wheels 14 in a four-wheel drive mode of operation. Likewise, if lockup of one of the front wheels 12 begins to occur during braking, the viscous clutch 30 will also interconnect the front and rear wheels 12 and 14 and thereby drive through the rear wheels in a manner that prevents the front wheel lockup.

During normal driving, the transaxle 28 provides only two-wheel driving of the front wheels 12. Differences in the extent of travel of the front wheels 12 and the rear wheels 14 can be accommodated by the viscous clutch 30 since the predetermined difference in the average speeds of the front and rear wheels is then not sufficient to provide interconnection between the auxiliary output 52 of the transaxle 28 and the differential 32 that drives the rear wheels.

Viscous clutch 30 illustrated in FIG. 1 includes a rotary input 55 of a sleeve construction which is connected to a housing 56 on which a first set of annular clutch plates 58 are mounted. A rotary output 60 of viscous clutch 30 drives the rear wheel differential 32 and supports a second set of clutch plates 62 that are arranged in an alternating relationship with the first set of clutch plates 58. Clutch housing 56 receives a suitable viscous fluid that permits relative rotation between the clutch input 55 and output 60 only at a relatively slow speed. When higher relative rotation takes place between the clutch input 55 and output 60, the viscous fluid locks the plates 58 and 62 to each other to prevent such rotation and thereby provide rotational driving through the clutch. In addition to supporting the clutch plates 62, the clutch output 60 also extends out of the clutch housing through the sleeve input 55 in a concentric relationship to support a selector gear 64.

Selector 54 of the drivetrain illustrated in FIG. 1 includes a movable selector member 66 that is rotatively coupled to the auxiliary output 52 of the transaxle 28. Selector member 66 is positionable in a first solid line indicated position 66a to disconnect the auxiliary output 52 of the transaxle 28 from the viscous clutch 30 and hence from the rear wheels 14. In this position, the vehicle driving is only through the front wheels 12 as provided by the transaxle 28 in the manner previously described. In a second position 66b, the selector member rotatively couples the auxiliary output 52 of the transaxle 28 to the input 55 of viscous clutch 30 such that rear wheel driving takes place when there is a predetermined difference in the average speeds of the front and rear pairs of wheels as previously described. In a third position 66c, the selector member rotatively couples the auxiliary output 52 of transaxle 28 with the gear 64 on the clutch output 60. This connection of the selector member in position 66c with the engagement thereof with output gear 64 provides a direct connection of the transaxle auxiliary output 52 with the clutch output 60 to provide direct driving of the rear wheels 14 in a bypassed relationship with respect to clutch 30. Such direct driving of the rear wheels 14 is desirable in adverse road conditions or in off the road travel.

Figure 2:
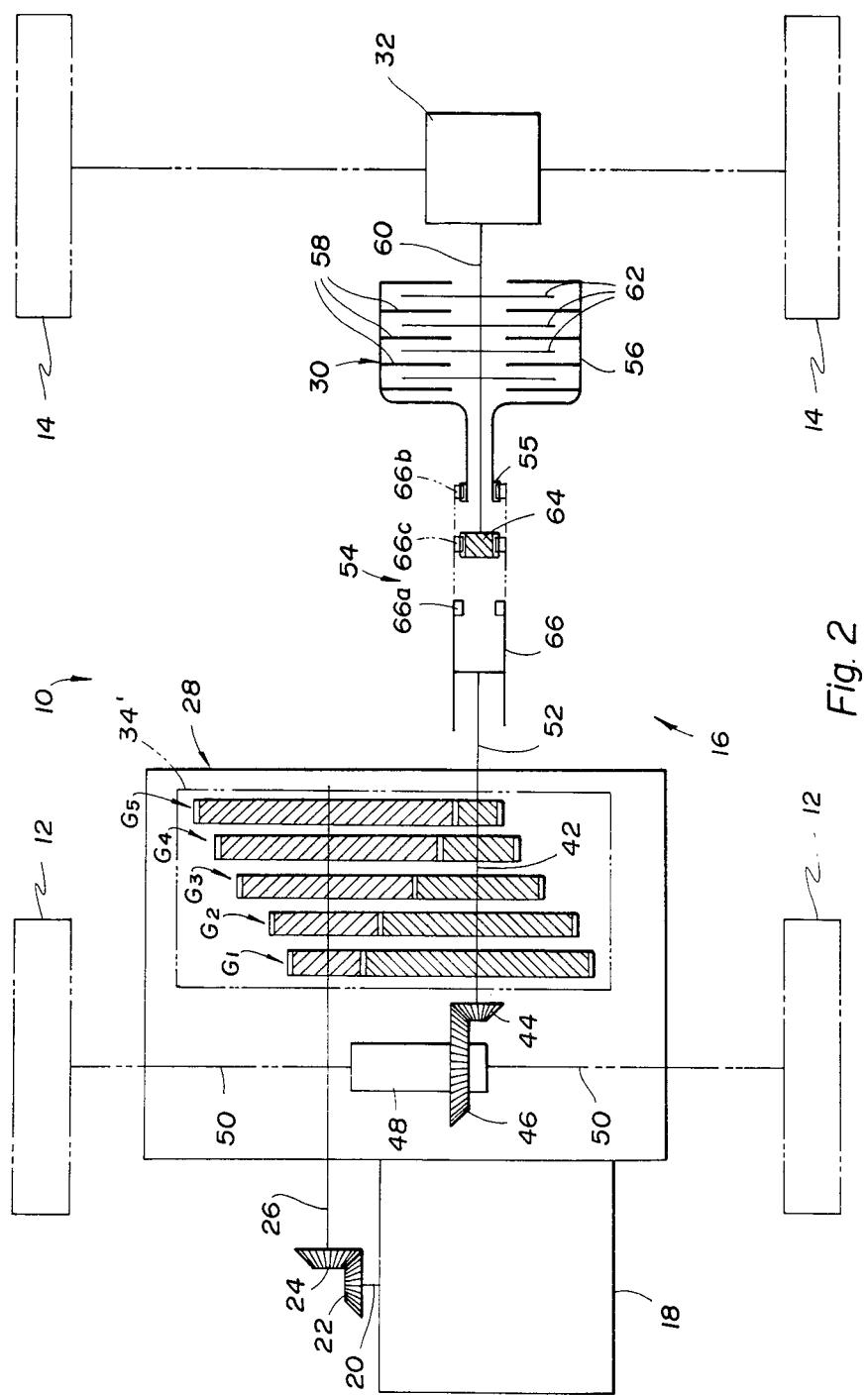
FIG. 2 is a schematic view of a vehicle including a drivetrain constructed in accordance with the invention and having a manually shiftable transaxle for providing wheel driving.

With reference to FIG. 2, a vehicle 10' illustrated includes a drivetrain 16 which is constructed in accordance with the present invention and similar to the previously described embodiment except as will be noted such that like components thereof are identified by like reference numerals and much of the previous description is applicable and thus will not be repeated. Drivetrain 16 of this vehicle 10' is the same as the previously described drivetrain except for the fact that the transmission 34' of the transaxle 28 is of the manual shifting type rather than the automatic shifting type. Sets of gears G1, G2, G3, G4, and G5 are mounted on the input 26 and output 42 of the transaxle with one of these sets of gears being engaged at a time to provide the required torque during driving. Other than the manual transmission 34', the drivetrain 16 of this embodiment has the same construction as the previously described embodiment.

It should be understood that while the best modes for carrying out the invention have been described in detail, those familiar with the art to which this invention relates will recognize various alternative designs and embodiments for practicing the invention as defined by the following claims.

What is claimed is:

1. In a vehicle including an engine having a rotary output, an improved drivetrain comprising: a transaxle having an input rotatively driven by the output of the engine and having a primary output for driving a first pair of wheels; said transaxle also having an auxiliary output; a viscous clutch having a rotary input and also having a rotary output connected to a second pair of wheels; and a selector for selectively: (a) disconnecting the auxiliary output of the transaxle from the second pair of wheels to provide driving by only the first pair of wheels, (b) connecting the auxiliary output of the transaxle with the rotary input of the viscous clutch to provide driving of the second pair of wheels through the viscous clutch along with the first pair of wheels when there is more than a predetermined difference in the average speeds of the first and second pairs of wheels or (c) connecting the auxiliary output of the transaxle directly to the second pair of wheels in a by-passed relationship to the viscous clutch to provide driving of the second pair of wheels along with the first pair of wheels.

2. A vehicle as in claim 1 wherein the engine is transversely mounted with respect to the vehicle.

3. A vehicle as in claim 1 or 2 wherein the transaxle includes an automatic transmission for shifting gears.

4. A vehicle as in claim 1 or 2 wherein the transaxle includes a manual transmission for shifting gears.

5. In a vehicle including a front engine having a rotary output, an improved drivetrain comprising: a front transaxle having an input rotatively driven by the output of the engine and havng a primary output for driving a front pair of wheels; said transaxle also having an auxiliary output; a viscous clutch having a rotary input and also having a rotary output connected to a rear pair of wheels; and a selector for selectively: (a) disconnecting the auxiliary output of the transaxle from the viscous clutch to provide front wheel driving, (b) connecting the auxiliary output of the transaxle with the input of the viscous clutch to provide driving of the rear pair of wheels when there is a predetermined difference in the average speeds of the first and second pairs of wheels, or (c) connecting the auxiliary output of the transaxle with the output of the viscous clutch to provide driving of the rear wheels along with the driving of the front wheels.

* * * * *